United States Patent [19]
Dorner

[11] Patent Number: 5,156,261
[45] Date of Patent: Oct. 20, 1992

[54] ARTICULATED LINK CONSTRUCTION FOR A CONVEYOR BELT TRACKING MECHANISM

[75] Inventor: Wolfgang C. Dorner, Oconomowoc, Wis.

[73] Assignee: Dorner Mfg. Corp., Hartland, Wis.

[21] Appl. No.: 821,686

[22] Filed: Jan. 16, 1992

[51] Int. Cl.⁵ .............................................. B65G 23/44
[52] U.S. Cl. ..................................... 198/816; 198/840
[58] Field of Search ............... 198/806, 813, 816, 840, 198/842

[56] References Cited

U.S. PATENT DOCUMENTS

| | | | |
|---|---|---|---|
| 1,347,121 | 7/1920 | Rice | 198/813 |
| 1,913,040 | 6/1933 | Pierson | 198/813 X |
| 2,808,924 | 10/1957 | Wood | 198/816 |
| 2,914,957 | 12/1959 | Johnson | 198/807 X |
| 3,035,685 | 5/1962 | Raynor | 198/816 X |
| 3,118,315 | 1/1964 | Loosli | 198/816 |
| 3,718,197 | 2/1973 | Barten et al. | 198/816 X |
| 3,752,298 | 8/1973 | Wenger | 198/816 |
| 3,878,937 | 4/1975 | Glaser et al. | 198/816 |
| 3,921,793 | 11/1975 | Hutchinson et al. | 198/816 X |
| 3,923,148 | 12/1975 | Dorner | |
| 4,438,617 | 3/1984 | Ulrich et al. | 198/840 X |
| 4,993,542 | 2/1991 | Nomura | 198/816 |

Primary Examiner—D. Glenn Dayoan
Attorney, Agent, or Firm—Andrus, Sceales, Starke & Sawall

[57] ABSTRACT

An improved articulated link construction used in a conveyor belt tracking mechanism. The conveyor includes a frame having a pair of spaced parallel side rails that support a bed plate and an endless conveyor belt is supported on the bed plate. A spindle assembly includes a pair of side members that are mounted for sliding movement with respect to the side rails and a spindle is journaled between the side members. A plate-like link extends transversely of the spindle assembly and the ends of the link are pivoted to the side members. Each pivotal connection includes a vertical bolt that extends through an opening in the respective side member and a bushing is threaded on the bolt and is received within an oversized opening in the link. A spring washer is interposed between the head of the bushing and the link, and maintains the link in snug contact with the side rails yet permits pivotal movement of the link relative to the side members to enable the side members to be moved relative to each other to track the belt.

14 Claims, 2 Drawing Sheets

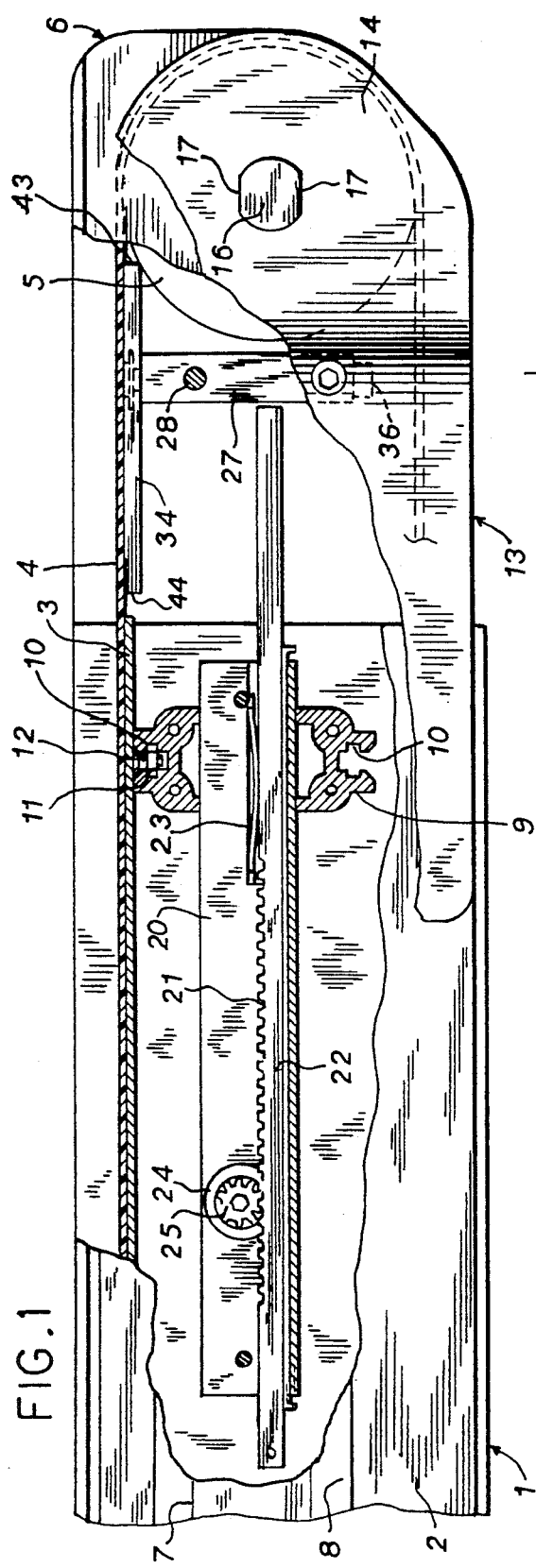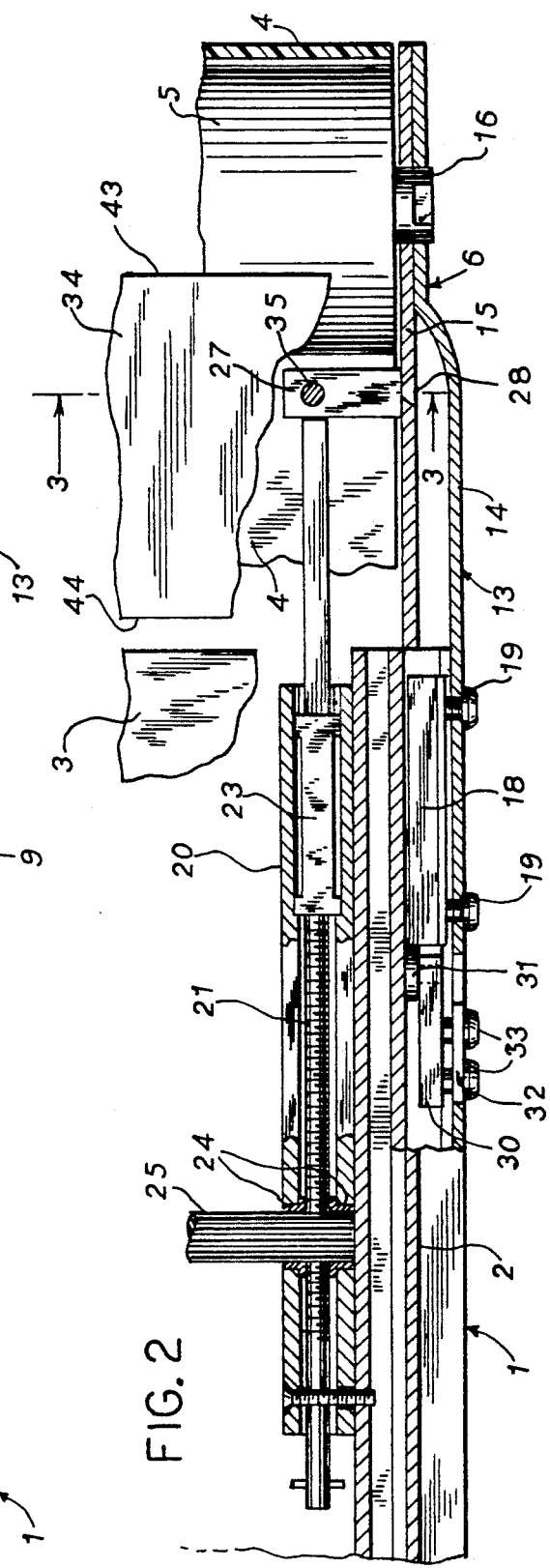

ARTICULATED LINK CONSTRUCTION FOR A CONVEYOR BELT TRACKING MECHANISM

BACKGROUND OF THE INVENTION

A typical conveyor for conveying relatively small articles includes a frame, having a pair of spaced side rails that support a bed plate. A conveying member, such as an endless conveyor belt, is supported on the bed plate and the belt is driven by a drive spindle or pulley which is located at one end of the conveyor, while the belt is trained over an idler spindle located at the opposite end of the conveyor.

It is desirable that a conveyor include a mechanism for tensioning and tracking the conveyor belt. In certain conveyors, the belt tensioning and tracking mechanisms are combined by journaling the ends of the tensioning roll or spindle in slide blocks which are slidable relative to the conveyor frame. By adjusting the position of the slide blocks, the belt tension and tracking can be adjusted. However, in mechanisms of this type, a tracking adjustment can effect the tensioning, and vice versa, so that trained personnel are required in order to properly adjust the tension and tracking.

U.S. patent application Serial Nos. 07/731/526, filed Jul. 17, 1991, and 07/637,636, filed Jan. 4, 1991, disclose improved belt tensioning and tracking mechanisms for a conveyor. In accordance with the teachings of the aforementioned patent applications, the conveyor belt is carried by an adjustable spindle assembly, which is located at one or both ends of the conveyor frame. The spindle assembly includes a belt-supporting spindle that is journaled between a pair of side members which are mounted for sliding movement relative to the side rails of the conveyor. Tension on the belt is adjusted by a rack and pinion mechanism in which at least one rack is mounted on the conveyor frame between the side rails and extends longitudinally of the frame. An end of the rack is engaged with the spindle assembly, while a pinion is mounted transversely between the side rails and is engaged with the rack. Rotation of the pinion will move the rack longitudinally to thereby adjust the position of the spindle assembly and control the tension on the conveyor belt.

The belt tracking mechanism, as disclosed in the aforementioned patent applications, is separate from the belt tensioning mechanism. The tracking mechanism includes a pair of cam blocks, each of which is mounted to one of the side rails of the conveyor. Each cam block includes a rotatable cam or eccentric that is engaged with the corresponding side member of the spindle assembly. By individually rotating each cam, each side member of the spindle assembly can be moved longitudinally to thereby skew or track the conveyor belt.

The spindle assembly, as described in the above patent applications, also includes an articulated linkage that extends transversely between the side members of the spindle assembly. The articulate linkage provides a dual function in that it not only stabilizes or provides rigidity for the spindle assembly, but due to the articulated nature, permits the side members of the spindle assembly to be moved longitudinally relative to each other to track the belt.

The side rails of the typical conveyor are produced with certain tolerances and similarly the side members of the spindle assembly, which are preferably metal stampings, are also formed within certain tolerances. Due to a tolerance build-up it has been found that when the side members of the spindle assembly are locked relative to the side rails of the conveyor frame, the side members may not be precisely parallel, but may tend to either converge or diverge, depending on the build-up of tolerances. This not only detracts from the appearance of the conveyor, but if the side members converge, the converging side members can restrict movement of the conveyor belt causing excessive wear on the belt and possible jamming.

SUMMARY OF THE INVENTION

The invention is directed to an improved articulated link construction for the spindle assembly of a conveyor. In accordance with the invention, the articulated linkage includes a flat, horizontal, plate-like link that extends transversely of the conveyor and is pivoted to the side members of the spindle assembly about vertical pivot axes. Each pivotal connection includes a vertical bushing that is secured to the respective side rail of the conveyor frame and the bushing is received within an oversized opening in the link. The oversized connection provides a gap or clearance.

Each bushing is provided with an enlarged head or flange which is located within a recess in the link, and a spring washer is interposed between the bushing flange and the bottom of the recess. The resiliency of the spring washer serves to snugly attach the link to the side members of the spindle assembly, yet will permit pivotal movement of the link relative to the side members to permit the side members to move longitudinally relative to each other for belt tracking purposes. The gaps between the bushings and the link compensate for tolerance buildup and maintains the side members of the spindle assembly in parallel relation when the bolts are tightened down.

As a further feature of the invention, the upper surface of the link is located substantially flush with the upper surface of the bed plate and also serves as a support for the conveyor belt. The outer transverse edge of the link is located adjacent the spindle, while the inner transverse edge of the link is located adjacent the bed plate. Thus, the link not only serves as an articulated connection between the side members of the spindle assembly, but also provides a bed plate extension for the conveyor belt.

Other objects and advantages will appear in the course of the following description.

DESCRIPTION OF THE DRAWINGS

The drawings illustrate the best mode presently contemplated of carrying out the invention.

In the drawings:

FIG. 1 is a fragmentary side elevation of a conveyor incorporating the invention with parts broken away in section;

FIG. 2 is a fragmentary horizontal section of the conveyor shown in FIG. 1;

FIG. 3 is a section taken along line 3—3 of. FIG. 2; and

DESCRIPTION OF THE ILLUSTRATED EMBODIMENT

Figure 3:
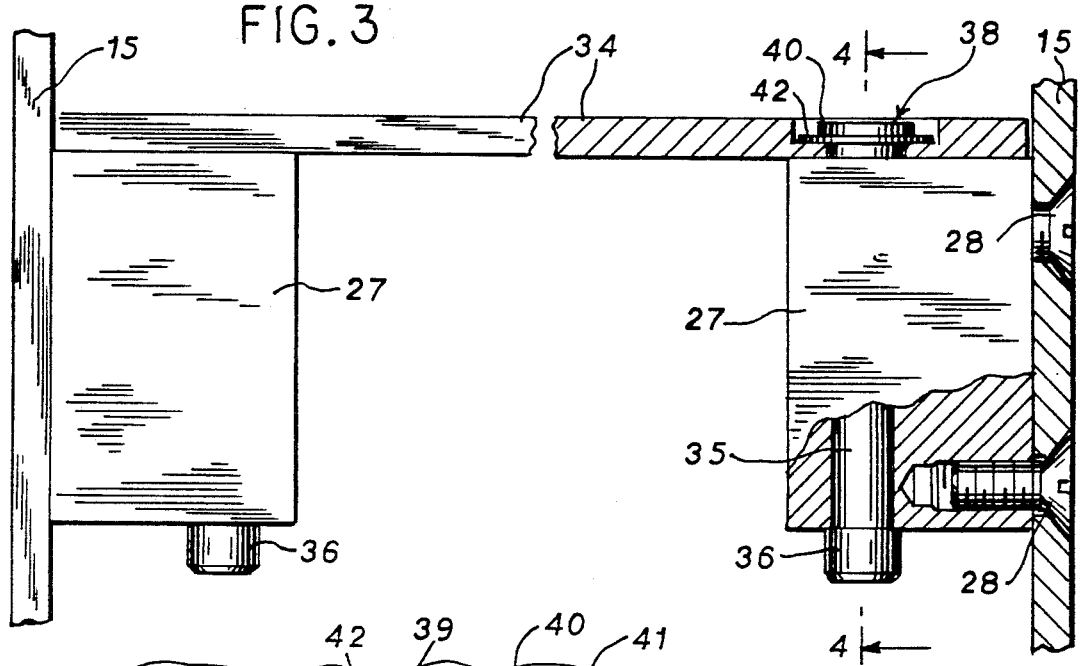

The drawings illustrate a conveyor having a frame 1 including a pair of spaced parallel side rails 2 that support a bed plate 3. An endless conveyor belt 4 rides on the bed plate 3 and is driven by a drive spindle or pulley, not shown. The belt is also trained around an idler spindle 5, carried by a spindle assembly 6, which is located at one end of the conveyor.

The conveyor frame and spindle assembly can be constructed as shown in U.S. patent application Ser. No. 07/731,526, filed Jul. 17, 1991. As disclosed in that application, each side rail 2 includes an upper longitudinal slot 7, and a parallel lower slot 8, both of which extend the length of the side rail. Each slot 7,8 is generally T-shaped in cross section.

Conveyor frame 1 also includes a plurality of spaced cross members 9 which extends transversely of the conveyor and serve to connect the side rails 2 together. As best shown in FIG. 1, the upper and lower ends of each cross member 9 are formed with generally T-shaped slots 10. Nuts 11 are mounted for sliding movement within the upper slots 10 and countersunk bolts 12 extend through holes in bed plate 3 and are received in nuts 11 to tie the bed plate to the cross members 9. The lower slots 10 can be employed, if desired, in a similar manner to attach other auxiliary components to the lower ends of the cross members.

Spindle assembly 6 includes a pair of parallel side members 13 which are mounted for sliding movement relative to side rails 2, and spindle 5 is journaled between the outer ends of the side members 13. As best shown in FIG. 2, each side member 13 is formed of a pair of laminated stamped metal plates 14 and 15, and a shaft 16, which carries the idler spindle 5, extends through aligned openings in the plates 14 and 15. The ends of shaft 16 are provided with a pair of opposed flats 17 which mate with flat edges bordering the aligned openings in plates 14. With this construction, shaft 16 is mounted in fixed relation to side members 13 and spindle 5 is journaled on shaft 16 by internal bearings, not shown.

To mount side members 13 of spindle assembly 6 for movement relative to side rails 2, a pair of guide bars 18 are secured to each side member 13 and are mounted for sliding movement in slots 7 and 8 of side rails 2. More specifically, as shown in FIG. 2, lower guide bar 18 is slidable within the lower slot 8. The upper guide bar 18, not shown, is connected in a similar manner to the side member 13 and is slidable within the upper slot 7. Bolts 19 extend through holes in outer plate 14 and are threaded in guide bars 18. By threading down bolts 19, the guide bars 18 will be drawn outwardly against the lips bordering the respective slots 7 and 8, to secure the side members 13 to the respective side rails 2. Conversely, loosening bolts 19 will permit the side members 13 to slide relative to the side rails 2.

The conveyor includes a belt tensioning mechanism for varying the tension on belt 4, and the belt tensioning mechanism can be similar to that described in U.S. patent application Ser. No. 07/731,526, filed Jul. 17, 1991. The belt tensioning mechanism includes an elongated block 20, having a generally U-shaped cross section, which is secured to the inner surface of each side rail 2, as seen in FIGS. 1 and 2. A rack 21 is mounted for sliding movement within each block 20. A wear strip 22 is positioned in the lower end of the groove in each block 20 to support the rack in movement, and a leaf spring 23, having its side edges mounted in opposed grooves in block 20, is engaged with the upper surface of each rack to urge the rack downwardly. The side portions of each block 20 bordering the central recess are formed with aligned openings which receive bushings 24, and a pinion 25 is mounted for rotation within bushings 24. The teeth of the pinion are engaged with the teeth of the two racks 21. One or both ends of pinion 25 are provided with a hex-shaped opening which is exposed through the respective side rail 2, and through the use of a hex-tool, pinion 25 can be rotated to thereby move both racks in unison in a direction longitudinal of the conveyor. It is contemplated that other types of tensioning mechanisms, such as a fluid cylinder, can be substituted for the rack and pinion mechanism.

The ends of racks 21 are engaged with blocks 27 attached to side members 13 of the spindle assembly 6, so that as the racks are moved outwardly through operation of pinion 25, the spindle assembly 6 will correspondingly be moved outwardly of the side rails 2 to increase the tension on belt 4. Blocks 27 are secured to the plates 15 by screws 28, as best shown in FIG. 3.

The conveyor also includes a belt tracking mechanism which can be similar to that disclosed in U.S. patent application Ser. No. 07/731,526, filed Jul. 17, 1991. As disclosed in that patent application the tracking mechanism includes an elongated block 30 which is mounted in the lower slot 8 of each side rail 2. As seen in FIG. 2, a cam or eccentric 31 is mounted for rotation on one end of each block 30, and the outer eccentric surface of cam 31 is engaged with the inner end of the respective guide bar 18. The hub of cam 31 can be provided with an outer hex-shaped hole to receive a tool, so that the cam can be rotated relative to block 30.

The cam block 30 is retained within lower slot 8 by a retaining or keeper plate 32, which is located on the outside of the respective side rail and is connected to the block via bolts 33.

In accordance with the invention, an articulated linkage connects the side members 13 of spindle assembly 6. The linkage includes a flat, horizontal, plate-like link 34, the ends of which are pivotally connected about vertical pivot axes to the blocks 27 of side members 13.

To provide the pivotal connection, a bolt 35 is mounted within a vertical bore in each block 27, and the head 36 of bolt 35 bears against the lower surface of the block. The upper end of each bolt is threaded, as indicated by 37, and is threadedly connected to a bushing 38, which is located within an oversized hole 39 in the respective end of link 34. The outer diameter of bushing 38 is smaller than the diameter of hole 39, so that there is a gap or clearance of about 1/32 inch between the bushing and the hole 39.

Figure 4:
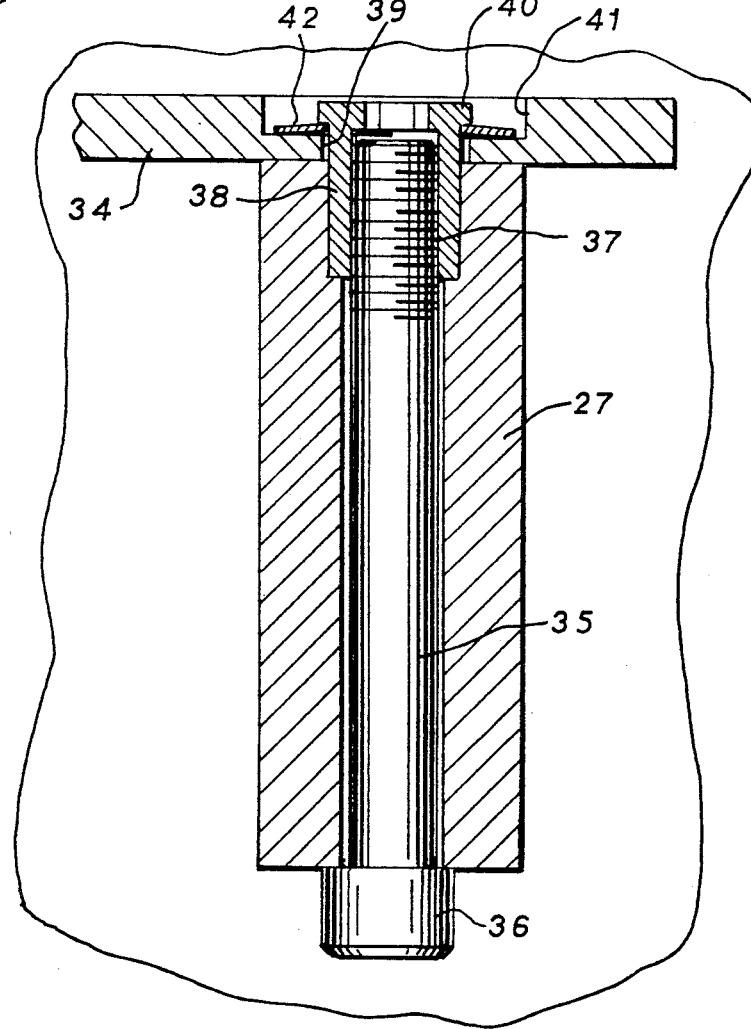
FIG. 4 is a section taken along line 4—4 of FIG. 3.

As best shown in FIG. 4, the upper end of each bushing 38 is provided with an outwardly extending head or flange 40, which is located within a recess 41 in link 34. Interposed between flange 40 and the bottom of recess 41 is a spring washer 42, such as a Bellville spring. Threading of bolt 35 in bushing 38 will act to compress the spring washer 42. Spring washers 42 provide a snug connection between link 34 and blocks 27 to prevent tilting or rattling, and yet will permit horizontal shifting of link 34 relative to the blocks 27 and side members 13 as locking bolts 19 are tightened to compensate for tolerance build-up within the conveyor components. Thus, with this construction, side members 13 of spindle assembly 6 will be maintained in a substantially parallel relationship regardless of the tolerances involved, thus preventing the outer ends of the side members 13 from converging or diverging.

Further, the pivotal connection provided by bushings 38 with link 34 enables the side members 13 of spindle assembly 6 to be moved longitudinally relative to each other during belt tracking.

As shown in FIG. 1, the upper surface of link 34 is substantially flush with the upper surface of bed plate 3, so that the link forms an extension to the bed plate and supports travel of belt 4. The outer transverse edge 43 of link 34 is located adjacent spindle 5, while the inner transverse edge 44 is positioned adjacent the outer end of bed plate 3, so that there is a minimal gap in the supporting structure for the conveyor belt.

The belt tensioning mechanism is operated as described in the aforementioned patent application. By rotation of pinion 25, racks 21 are moved longitudinally outward to exert a force against the respective blocks 27 of the articulated linkage to thereby apply tension to belt 4. The spindle assembly 6 is then locked relative to the side rails 2 by tightening bolts 19.

In tracking the belt, bolts 19 are loosened to permit side members 13 of spindle assembly 6 to be moved relative to side rails 2 and each cam 31 can then be individually rotated to move the corresponding side member 13 of the spindle assembly 6 relative to the other side member, thereby causing skewing or tracking of the belt.

Not only does the articulated linkage of the invention maintain the side members 13 in parallel relation, but also provides rigidity for the spindle assembly 6 to prevent deformation of the spindle assembly in the event the end of the conveyor is subjected to an external force or impact.

Various modes of carrying out the invention are contemplated as being within the scope of the following claims particularly pointing out and distinctly claiming the subject matter which is regarded as the invention.

I claim:

1. A conveyor construction comprising a frame including a pair of side rails, an endless conveyor belt mounted for movement on said frame, a spindle assembly including a pair of spaced parallel side members and a spindle journaled relative to said side members and disposed to support said belt, each side member mounted for longitudinal movement relative to a respective side rail, a link extending transversely of said spindle assembly, pivot means for pivotally connecting the ends of said link to the respective side members about vertical pivot axes, means for permitting relative movement of said link relative to said side members in a transverse direction, and resilient means for connecting said link to said side members.

2. The conveyor of claim 1, wherein said resilient means is constructed and arranged to prevent free movement of said link with respect to said side members and to permit pivotal movement of said link relative to said side members.

3. The conveyor of claim 1, and including a bed plate extending transversely between said side rails, said link having an upper surface disposed substantially flush with the upper surface of said bed plate, said link extending between a transverse end of the bed plate and said spindle.

4. The conveyor of claim 1, wherein each of said pivot means comprises a vertical shaft, said link having a pair of openings each to receive one of said shafts, each of said openings having a larger diameter than the outer diameter of the respective shafts to thereby provide a clearance therebetween, said clearance comprising said means for permitting relative movement of said link relative to said side members.

5. A conveyor, comprising a frame including a pair of side rails, a bed plate supported on said side rails, a conveyor belt disposed to ride on said bed plate, a spindle assembly disposed to move relative to an end of said conveyor, said spindle assembly comprising a pair of side members each mounted for sliding movement relative to a corresponding side rail, said spindle assembly also including a spindle extending transversely of said conveyor and journaled for rotation relative to said side members, a link extending transversely of the conveyor, vertical shaft means associated with each side member, said link having a pair of openings each disposed to receive a corresponding shaft means, the diameter of each opening being greater than the outer diameter of the corresponding shaft means to provide a gap therebetween and permit transverse shifting of said link relative to said side members, resilient means interconnecting the link and said shaft means for exerting a biasing force to prevent free movement of said link relative to said shaft means, and belt tracking means for moving one of said side members relative to the other of said side members to thereby track said belt.

6. The conveyor of claim 5, wherein each shaft means comprises a bushing received within said opening and having a radial flange, said resilient means comprising a spring washer disposed between said flange and said link.

7. The conveyor of claim 5, wherein said link comprises a generally flat plate having a pair of opposed transverse edges, a first of said edges being disposed adjacent said bed plate and a second of said edges being disposed adjacent said spindle.

8. The conveyor of claim 6, wherein each shaft means also includes a bolt connected to the respective side member and having a threaded end, said bushing being engaged with said threaded end.

9. The conveyor of claim 5, and including a block projecting inwardly from each side member, said shaft means connected to said block.

10. The conveyor of claim 5, and including belt tensioning means for moving said spindle assembly longitudinally of said frame to thereby adjust the tension on said belt.

11. The conveyor of claim 10, and including a block projecting inwardly from each side member, each shaft means being journaled relative to said block, said belt tensioning means including an actuating member mounted for movement longitudinally of the conveyor and engageable with said block.

12. The conveyor of claim 5, wherein said belt tracking means includes an eccentric mounted for rotation relative to a side rail and operably engaged with an abutment on said one side member, rotation of each eccentric moving said one side member relative to the other side member.

13. A conveyor, comprising a frame including a pair of side rails, a bed plate mounted on said side rails, a conveyor belt mounted for movement on said bed plate, a spindle assembly mounted for longitudinal movement relative to an end of said conveyor and including a pair of side members mounted for sliding movement relative to the respective side rails, locking means for locking each side member to the respective side rail, said spindle assembly also including a spindle extending transversely of the conveyor and journaled relative to said side members, said belt being trained over said spindle, vertical shaft means mounted for rotation relative to each side member, a link extending transversely of said conveyor and having an opening disposed in each end thereof, each opening disposed to receive a respective shaft means, the portion of each link bordering the opening being spaced radially from the respective shaft means to provide a clearance therebetween of sufficient magnitude to permit said link to shift transversely relative to said shaft means, each shaft means having a radial abutment, and a resilient washer interposed between each abutment and the link, said resilient washer providing a snug connection between the link and the shaft means but permitting pivotal movement of said link relative to said shaft means and transverse shifting of said link relative to said side members when said locking means is engaged, and belt tracking means for moving one of said side members relative to the other of said side members to thereby track said belt.

14. The conveyor of claim 13, wherein the ends of said link are provided with upwardly facing recesses, said openings being disposed concentrically of said recesses, each spring washer being disposed between the respective abutment and the bottom of the respective recess.

* * * * *